(No Model.) 2 Sheets—Sheet 1.
W. WATERS.
AUTOMATIC HEAT REGULATING APPARATUS.
No. 533,975. Patented Feb. 12, 1895.
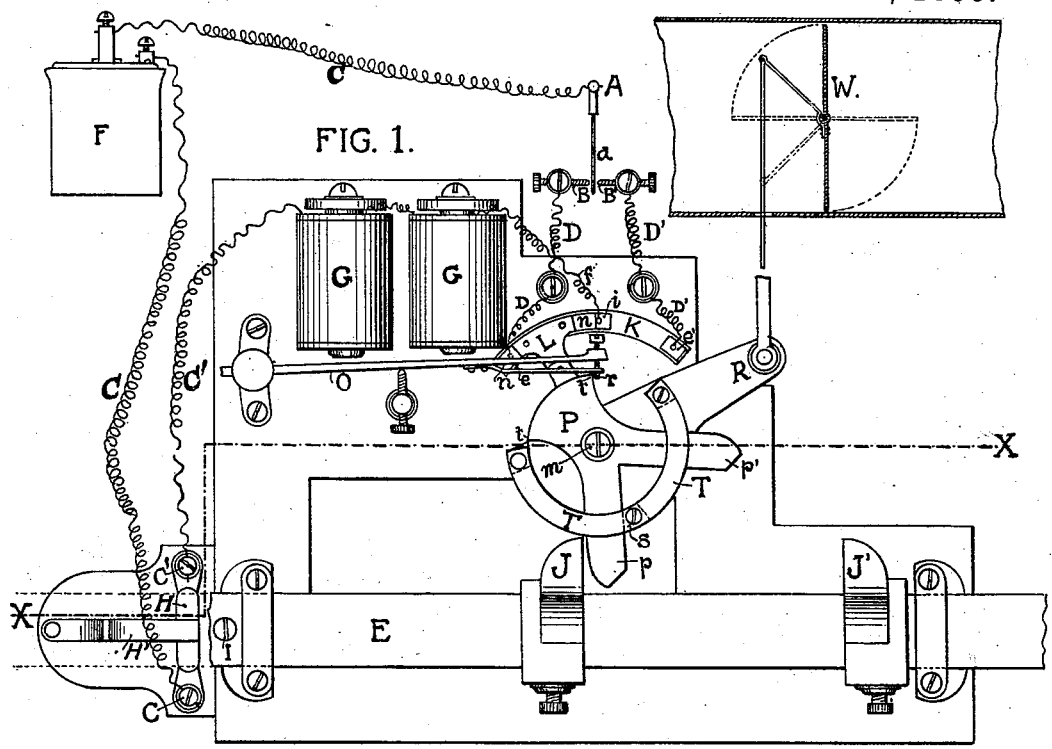
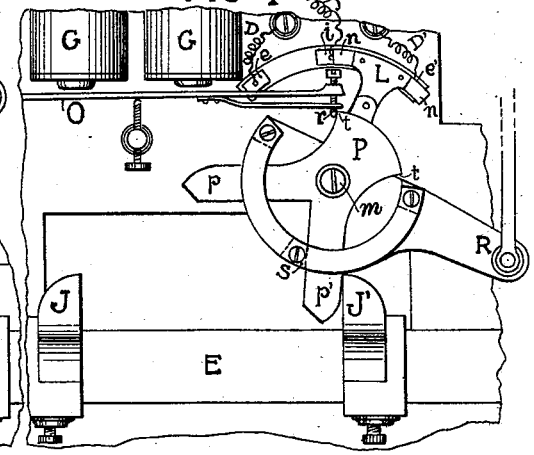
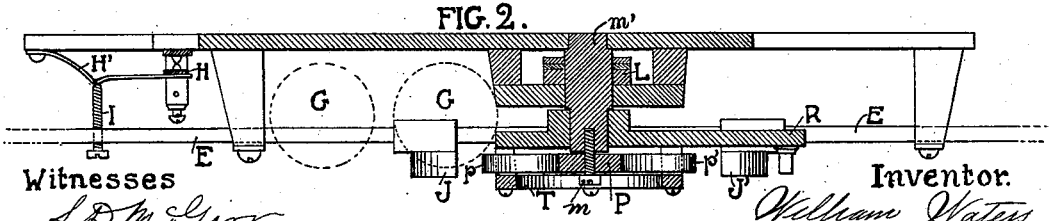
Witnesses Inventor.
William Waters
per. Attorney

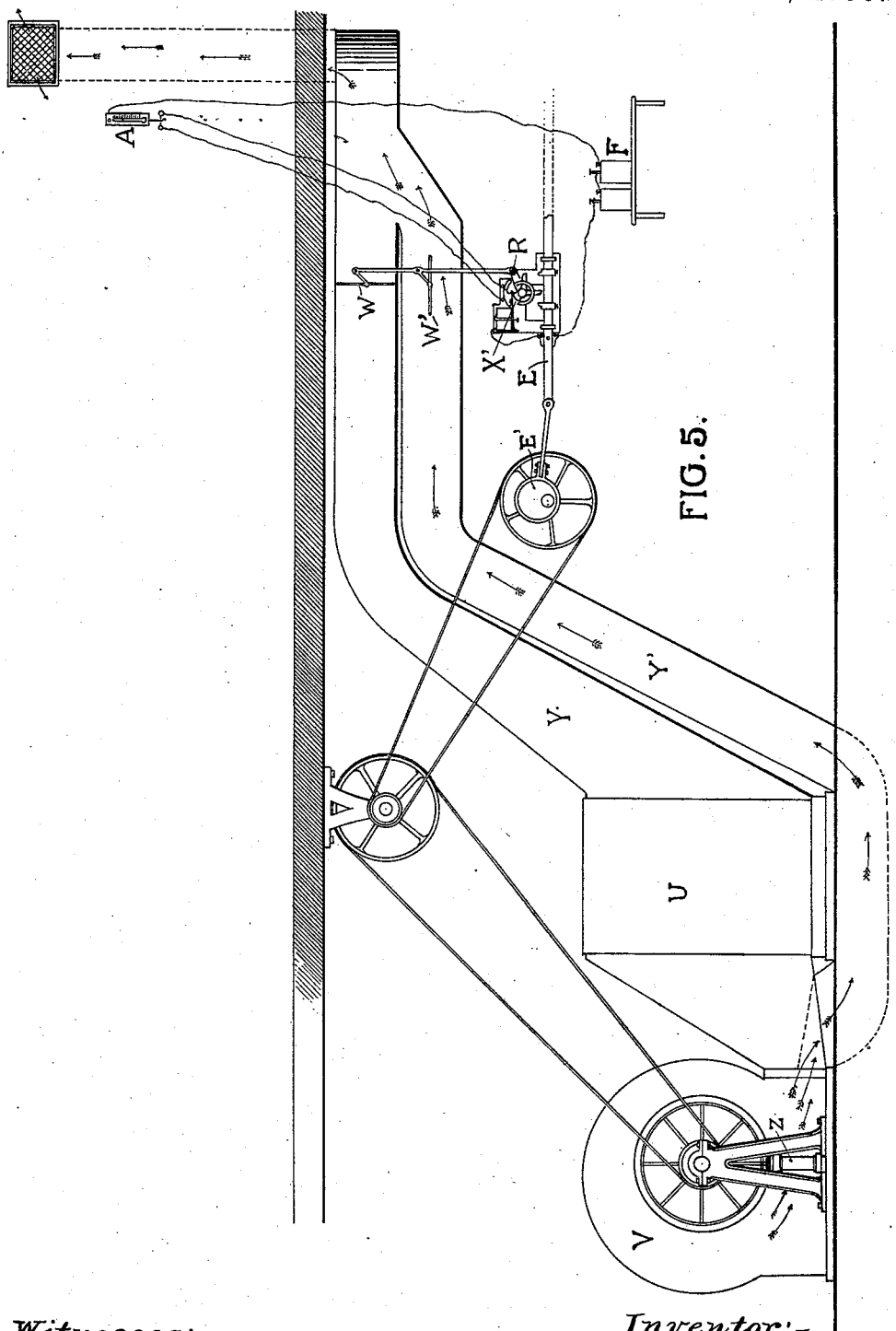

UNITED STATES PATENT OFFICE.

WILLIAM WATERS, OF OSHKOSH, WISCONSIN.

AUTOMATIC HEAT-REGULATING APPARATUS.

SPECIFICATION forming part of Letters Patent No. 533,975, dated February 12, 1895.

Application filed July 20, 1894. Serial No. 518,146. (No model.)

*To all whom it may concern:*

Be it known that I, WILLIAM WATERS, a citizen of the United States, residing at Oshkosh, in the county of Winnebago and State of Wisconsin, have invented certain new and useful Improvements in Automatic Heat-Regulating Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an electric automatic heat regulating device in which a regulator operates in conjunction with a thermostat, battery, and power; and the object of my device is to maintain a uniform temperature in the rooms of the building by controlling the flow of steam, hot water, air, &c., at the same time providing for the ventilation of the building. I attain these objects by the mechanism illustrated in the accompanying drawings.

Figure 1 is a front view of the regulator. Fig. 2 is a sectional view on the line X—X. Figs. 3 and 4 are detail views showing the machine in different positions. Fig. 5 is an elevation of the entire machine as applied to the system of hot blast or fan heating system.

Similar letters refer to similar parts throughout the several views.

In Fig. 5, V is the fan supplying the air to the rooms to be heated. Z' is the engine furnishing the power. U is the heater furnishing the heat by steam coils or otherwise. Y and Y' are the hot and cold air pipes respectively leading to the rooms to be heated. X' in Fig. 5 is the regulating apparatus operating the dampers W and W'. E' is the eccentric moving the bar E back and forth on the machine X'. The power to move the eccentric E' is obtained from the engine Z by means of the belts and pulleys as shown. The engine Z moving the fan V forces the air through the heater and the pipe Y to the rooms to be heated. The cold air passes below the heater U through the pipe Y'. The temperature of the room is regulated by the thermostat A operating on the machine X' moving the dampers W and W', the damper W being closed when the temperature is above the point at which the thermostat is set operating the damper W' at the same time, letting the cold air pass. When the temperature drops below the point at which the thermostat is set the damper W' is closed and W opened as hereinafter described.

A in Fig. 1 is the thermostat located in the room in which the temperature is to be regulated and is set at the temperature required. F is the battery and is connected with the machine and the thermostat by the wires C and C'. The bar E is connected with the eccentric as shown in Fig. 5 and is thus kept constantly moving back and forth slowly and in a horizontal direction. The lever R is connected with the pinion $m'$ and on this pinion $m'$ is secured the double fork lever P by the screw $m$, the double fork lever P working loosely on this screw. The elements of the machine being in the position as in Fig. 1, the double fork lever P is retained in the position shown by the pin $r$ catching on the lever P at $t$. This retains the lever in the position shown, the jaws J and J' having no action on the double forked lever P when in this position. The temperature in the room falling below the point at which the thermostat is set, causes the arm of the thermostat $a$ to come in contact with the point B. This completes the circuit through D to $e$ and thence through the metallic plate $n$ to the point $i$ and from $i$ through the wire $f$, through magnets G to the point C', through the small metallic bar H and through the point C and wire C to the battery F. On completing the circuit the armature O is attracted by the magnet G, releasing the point $r$ from the double forked lever P. This lever being hung loosely by the screw $m$ is permitted to fall into the position in Fig. 3, the arm $p'$ of the double forked lever P, striking against the pin $s$ attached to the lever R. The bar E moving in a horizontal direction causes the jaw J' to come in contact with the double forked lever P at the point p' moving the double forked lever P to the position shown in Fig. 4. The fork p' being in contact with the point s on the lever R it moves the lever R to the position shown in Fig. 4, thus opening the damper W and closing W' as in Fig. 5. The lever L being connected with the pinion m is moved to the position as shown in Fig. 4 and the circuit between the points e and i is broken and is made between the points i and e' by the metallic bar n. This permits the point r to drop against the double forked lever P at t and thus retaining the double forked lever P in the position shown in Fig. 4, permitting the bar E and the jaws J and J' to move without acting on the double forked lever P.

The temperature in the room rising above the point at which the thermostat is set, causes the arm of the thermostat a to come in contact with the point B' completing the circuit through the wire D' to the point e' and from the point e' through the metallic bar n to the point i as shown in Fig. 4, from this point through the wire f, the magnets G, the wire C', through the metallic bar H and through the wire C to the battery F. On completing the circuit the magnets G G attract the armature O and release the point r allowing the double forked lever P to drop into the position shown in Fig. 3; but the lever R being in position shown in Fig. 4 the fork p of the double forked lever P strikes against the pin s on the lever R. The jaw J strikes the double forked lever at the point p moving the double forked lever P and the lever R to the position shown in Fig. 1. This causes the damper W' in the cold air pipe to be opened and damper W to be closed as shown in Fig. 5. This movement also moves the lever L into the position shown in Fig. 1, breaking the circuit between i and e' and closing that between i and e thus retaining the double forked lever P in the position shown in Fig. 1. In Figs. 1 and 2 is the spring H' to which is attached the small metallic bar H. When the bar E is in the position as shown in Figs. 2 and 3, the screw I in the bar E presses down on the spring H' causing the metallic bar H to come in contact with the points c and c'. This completes the circuit between the two points c and c' when the bar E is in the position shown in Fig. 3 and when complete at other points, while at other times the circuit is broken between the two points.

It will be seen from the aforegoing that when the fork P drops from either of its raised positions to the position shown in Fig. 3, the arm L remains stationary and does not break the circuit through the plates upon which it rests and thus if the bar E were moving in the wrong direction, when the fork P fell to the lowered position, it would only be temporarily raised to the position it last occupied as the reverse movement of the bar E would again complete the circuit at the points c, c', and again raise the pin r and allow the fork to drop again and then be raised to the reverse position, which movement will break the circuit formed through the end of arm L and thus permit the pin r to remain down in its lower position and engage with the fork P and hold it in this position until the thermostat again shifts.

What I claim as my invention is—

1. In an automatic heat regulating apparatus, the combination of a circuit, a thermostat in said circuit, a switch for shunting the circuit, a lever for moving said switch, a catch engaging said lever, a magnet in the circuit for releasing the catch, a damper connected to said lever, a continuously reciprocated bar adapted to move said lever, and a source of electrical energy, substantially as described.

2. In an automatic heat regulating apparatus, the combination of a circuit a thermostat, in said circuit a switching device for shunting the circuit, a damper operating lever connected to said switching device, a catch engaging said lever, magnets for operating the catch and forming part of the electric circuit, a damper connected to said lever, a continuously reciprocated bar provided with adjustable projections that engage and operate said lever, means connected to said bar whereby the circuit of the magnets is alternately completed and broken, and a source of electrical energy, substantially as described.

3. In an automatic heat regulating apparatus, the combination of a circuit, a thermostat in said circuit, a switching device adapted to complete said circuit and connected to the heat regulating valve or damper by a lever, a catch engaging said lever, magnets for operating said catch and forming part of the circuit, a continuously reciprocated bar adapted to make and break the circuit and also to operate said lever, and a source of electrical energy, substantially as described.

4. In an automatic heat regulating apparatus, the combination of a circuit, a thermostat in said circuit, a switching device adapted to complete said circuit, a damper operating lever connected to said switching device and being capable of movement independent of the same to a limited extent, a catch engaging said lever, magnets for operating said catch and forming part of the circuit, a continuously reciprocated bar adapted to engage and move said lever when it is released from the electric catch, and a source of electrical energy, substantially as described.

5. In an automatic heat regulating apparatus, the combination of a circuit, a thermostat in said circuit, a switching device electrically connected thereto, a lever carrying said switching device, a catch engaging said lever, magnets forming part of the circuit and operating said catch a continuously reciprocated bar provided with adjustable projections which are adapted to strike and operate the switching device, an electric circuit closer operated upon each reciprocation of said bar to close the circuit, said circuit closer consisting of a spring arm adapted to be pressed against two contact points by a projection on the reciprocating bar, and a source of electrical energy, substantially as described.

In testimony whereof I affix my signature in presence of two witnesses.

WILLIAM WATERS.

Witnesses:
HENRY HENKEL,
CHARLES J. SCHMITT.